US005490384A

United States Patent [19]

Lunzman

[11] Patent Number: 5,490,384

[45] Date of Patent: Feb. 13, 1996

[54] HYDRAULIC FLOW PRIORITY SYSTEM

[75] Inventor: Stephen V. Lunzman, Chillicothe, Ill.

[73] Assignee: Caterpillar Inc., Peoria, Ill.

[21] Appl. No.: 351,919

[22] Filed: Dec. 8, 1994

[51] Int. Cl.[6] .............................. F16D 31/00; F15B 11/08

[52] U.S. Cl. .............................. 60/327; 60/484; 91/461; 91/459

[58] Field of Search .............................. 60/327, 329, 484, 60/368, 420, 422, 426; 91/515, 516, 461, 459, 532

[56] References Cited

U.S. PATENT DOCUMENTS

| | | | |
|---|---|---|---|
| 4,475,333 | 10/1984 | Tordenmalm | 60/420 X |
| 4,516,469 | 5/1985 | Sato et al. | 60/422 X |
| 4,688,380 | 8/1987 | Reinhardt et al. | 60/420 |
| 4,718,329 | 1/1988 | Nakajima et al. | 91/459 X |
| 4,768,339 | 5/1988 | Aoyagi et al. | 60/427 |
| 4,955,283 | 9/1990 | Hidaka et al. | 91/461 X |

FOREIGN PATENT DOCUMENTS

| | | | |
|---|---|---|---|
| 1488606 | 6/1989 | U.S.S.R. | 91/515 |

*Primary Examiner*—Edward K. Look
*Assistant Examiner*—Hoang Nguyen
*Attorney, Agent, or Firm*—Steven R. Janda; Thomas J. Bluth

[57] ABSTRACT

A hydraulic system for a construction machine includes a pump for delivering fluid under pressure from a fluid reservoir to at least first and second main valves. First and second input devices are included for producing first and second control signals that are indicative of a desired operation of the hydraulic system. A controller responsive to at least the first and second control signals is provided and produces a compensating signal in response to the first and second control signals. The second main valve is operated in response to both the second control signal and the compensating signal.

6 Claims, 2 Drawing Sheets

HYDRAULIC FLOW PRIORITY SYSTEM

TECHNICAL FIELD

The present invention relates generally to fluid systems and more particularly to a hydraulic priority system and method for a construction machine or the like.

BACKGROUND ART

Hydraulic systems are utilized in many forms of construction equipment such as hydraulic excavators, backhoe loaders, and end loaders. The equipment is usually mobile having either wheels or track and includes a number of hydraulically actuated devices such as hydraulic cylinders and motors. In most cases the hydraulic circuits are controlled by a parallel valve arrangement in which a hydraulic pump provides pressurized fluid to a plurality of hydraulic valves each associated with a hydraulic cylinder or motor. As an operator manipulates control levers located in the operator's compartment, hydraulic valves are controllably opened and closed such that pressurized fluid is controllably directed to the desired cylinder or motor.

If two such hydraulic valves connected in a parallel arrangement are opened simultaneously, the amount of fluid flowing through each of the valves is dependent upon the relative pressures in each fluid circuit and the relative size of the openings of each valve. In many situations, however, it is desirable to give priority to one particular cylinder or motor that would ordinarily not receive a high flow rate when operated simultaneously with low pressure circuits.

For example, if the control valve for the swing motor on an excavator is being operated at the same time that the stick cylinder is operated, it is advantageous to give priority to the swing motor. This is because the operator is most likely working on the sidewall of a trench and therefore requires a high force to be applied to the sidewall. To achieve the desired effect, the hydraulic system should automatically give hydraulic flow priority to the swing motor by decreasing the flow directed to the stick cylinder. Similarly, if both the travel motor and the boom are being operated, it is advantageous to give priority to the travel motor.

The present invention is directed at overcoming one or more of the problems as set forth above.

DISCLOSURE OF THE INVENTION

In one aspect of the present invention there is provided a hydraulic system for a construction machine comprising a pump for delivering fluid under pressure from a fluid reservoir to at least first and second main valves. First and second input devices are included for producing first and second control signals that are indicative of a desired operation of the hydraulic system. A controller responsive to at least the first and second control signals is provided and produces a compensating signal in response to the first and second control signals. The second main valve is operated in response to both the second control signal and the compensating signal.

In another aspect of the invention, a method for controlling a main valve operated in response to first and second pilot valves includes the steps of producing first and second control signals in response to movement of a first and a second input devices, respectively, producing a compensating signal in response to the first and second control signals, controlling one of the pilot valves in response to the second control signal, and controlling the other pilot valve in response to the compensating signal.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
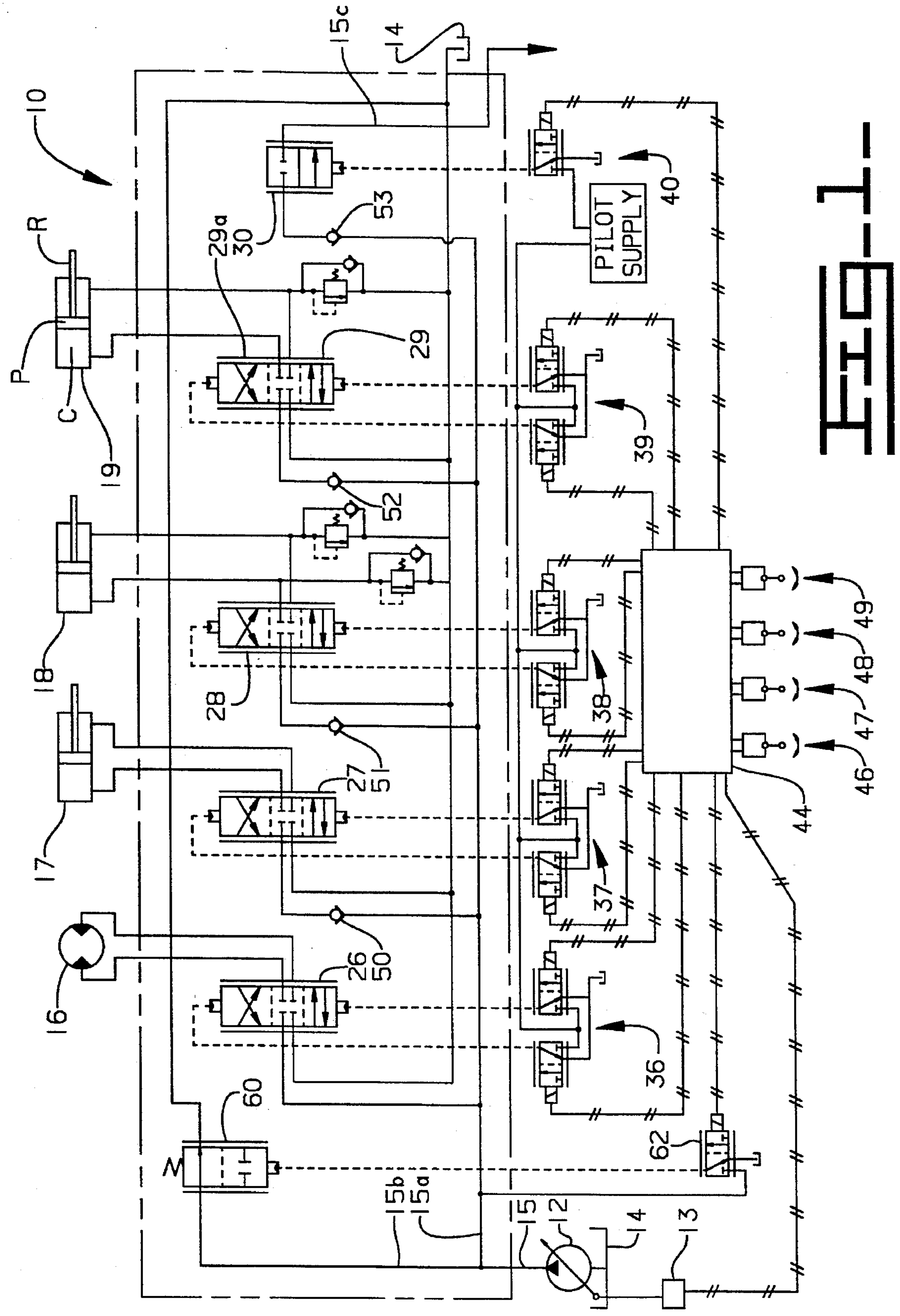
FIG. 1 is a schematic of a hydraulic system illustrating one preferred embodiment.

As shown in FIG. 1, a hydraulic system 10 includes a variable displacement hydraulic pump 12 for delivering fluid under pressure from a fluid reservoir 14 to a supply line 15, and four hydraulic actuators 16–19. Four variable or infinite positioning directional control valves 26-29 are connected to supply line 15 via branch line 15*a* and are operative to control flow of the hydraulic fluid to each of the actuators 16–19, respectively. A fifth control valve 30 operates as a crossover valve for a purpose described below. Each of the control valves 26–30 is of the closed-center type and is preferably pilot operated by pairs of infinite positioning pilot valves 36–40, respectively. Each of the pilot valves is solenoid operated and actuated by electrical signals generated by a controller 44 as hereafter described. Manually operated control devices 46–49, which may be potentiometers or pulse width modulated devices, generate control signals that are input to the controller or microprocessor 44 to operate the pilot valves 36–40, respectively. The control devices 46–49 may be electronic joysticks and/or peddles. Control devices 46–49 are conveniently hard wired to the controller 44 which has a plurality of control algorithms.

A bypass line 15*b* is provided to return fluid to the reservoir 14. An infinite positioning bypass valve 60 is interposed in the bypass line 15*b* and is operated by an infinite positioning pilot valve 62 under control of the controller 44.

In operation, when the system 10 is idling (i.e. there is little or no usage by the hydraulic actuators 16–19), bypass valve 60 is wide open to provide flow through bypass line 15*b*. When one or more of the control valves 26–30 are opened, bypass valve 60 closes simultaneously, increasing pressure in the line 15*b*. The increased pressure allows pump flow to open load checks 50–53 and provide flow to the control valves 26–30. The bypass valve 60 is modulated under control of a controller (microprocessor) 44 to provide operation of the closed-center valves 26–30 as if the system were one having open-center valves. Advantageously, flow from the pump 12 increases in response to control signals from the input levers 46–49 being produced. In response to the control signals, the controller 44 delivers a signal to the pump actuator 13 causing the proper pump output to be produced for the desired system operation, as indicated by the control signals.

The controller 44 sends a suitable output signal to pilot valve 62 for controlling (i.e. modulating) the position of the spool of the bypass valve 60. Likewise, output signals are sent to pilot valves 36 for controlling the spool positions of main valves 26. A further output signal is also sent to pilot valve 40 to control the crossover valve 30.

Figure 2:
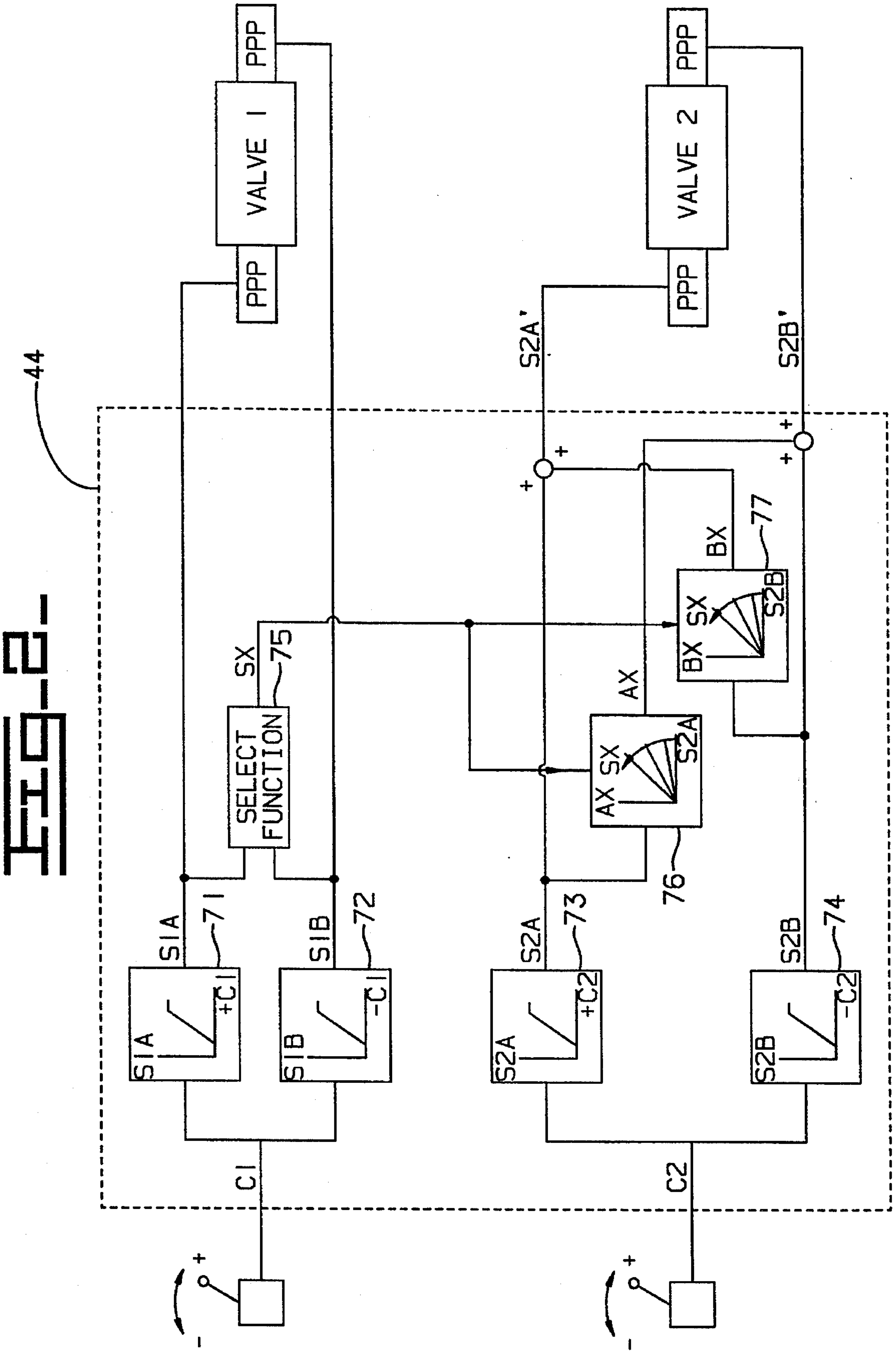
FIG. 2 is a diagrammatic illustration of a control used in an embodiment of the present invention.

Turning now to FIG. 2, an electronic control is shown for providing valve priority in a hydraulic circuit with a parallel valve arrangement. In the embodiment shown in FIG. 2, only two inputs from the control devices 46–49 are illustrated for simplicity. However, it should be understood that in the preferred embodiment, the other two control signals are also delivered to the controller 44. It should also be appreciated that other combinations of input signals can be used without deviating from the invention.

As shown in FIG. 2, the controller 44 accepts control signal inputs C1,C2 from two of the control devices 46–49 and delivers actuator signals to proportional pilot pressure (PPP) actuators which in turn control the position of the main valve spools. While not shown, it should be understood that the actuator signals are first delivered to digital-to-analog converters and then to power amplifiers before being ultimately delivered to the PPP actuators.

Advantageously, each of the control signals C1,C2 are delivered to a pair of modulation tables 71, 72 and 73, 74. If the control device is moved in one direction (arbitrarily chosen as the positive direction), the control signal is in a range in which an actuator signal S1A, S2A is produced by the associated modulation table, but the actuator signal associated with the negative direction S1B,S2B is zero. In the preferred embodiment, a dead-band also exists such that no actuator signal is produced if the operator's lever is moved only a slight degree. In the preferred embodiment, the magnitude of the actuator signal S1A, S2A is increased as the control device is deflected further in the positive direction until a maximum is reached.

If the control device is moved in the other direction (arbitrarily chosen as the negative direction), the control signal is in a range in which an actuator signal S1B,S2B is produced by the associated modulation table but the actuator signal associated with the positive direction S1A, S2A is zero. In the preferred embodiment, a dead-band also exists such that no actuator signal will be produced if the operator's lever is moved only a slight degree. In the preferred embodiment, the magnitude of the actuator signal S1B,S2B is increased as the control device is deflected further in the negative direction until a maximum is reached.

The select function 75 selects the active or non-zero actuator signal associated with valve 1 (S1A or S1B) and outputs signal SX to priority tables 76, 77 for valve 2.

For example, if S2A is active (and S2B inactive) and SX is also active, then a compensating signal AX is produced such that:

$$S2A'=S2A$$

$$S2B'=S2B+AX=0+AX$$

Therefore, although actuator signal S2A' is tending to increase the stroke of valve 2, signal S2B' is increased by AX and tends to reduce the stroke of valve 2. This control thus causes the stroke of valve to be reduced when the stroke of valve 1 is increased and effectively provides valve 1 with flow priority.

In the preferred embodiment, the priority tables 76, 77 are look-up tables of a type well-known in the art and are stored in a memory device (not shown) associated with the controller 44. The look-up tables are advantageously multi-dimensional and provide compensating signals AX,BX in response to both the value of the selected signal SX and the actuator signal (S2A or S2B) associated with valve 2. Preferably, when either SX or the actuator signal is inactive, the compensating signal (AX or BX) associated with that priority table is also inactive. Advantageously, the characteristics stored in the multi-dimensional look-up tables express compensating signals as a function of actuator signals, but with increasing slope in response to the selected signal SX.

It should be appreciated by those skilled in the art that this control may be applied to multiple valves which control cylinders or motors.

INDUSTRIAL APPLICABILITY

The hydraulic system 10 is advantageously used in construction equipment such as hydraulic excavators, backhoe loaders and end loaders. The hydraulic actuator 17 may operate an attachment device and the hydraulic lines leading to it conveniently have quick disconnects. Hydraulic actuators 18 and 19 may be a bucket cylinder and a boom cylinder, respectively, in the form of hydraulic rams. As diagrammatically illustrated in FIG. 1, the hydraulic rams each include a piston P mounted in a cylinder C for reciprocation therein, and at least one piston rod R connected to the piston P and extending out of the cylinder C. The hydraulic lines leading to bucket cylinder 18 typically have relief valves in parallel with a one-way or check valve that serves as a make-up valve to limit cavitation. Similarly, a hydraulic line from the boom cylinder 19 has a relief valve and a one-way valve. The uppermost position **29*a* (as shown in FIG. 1) of control valve 29 advantageously has restrictors and a check valve which serve to feed fluid to the opposite end of the boom cylinder 19** as it is lowered, for flow regeneration and energy conservation. The check valve could be a separate valve, if desired.

A second, similar hydraulic system, complete with pump and directional control valves may be under control of controller 44 and supply fluid to the second travel motor, a swing motor and a stick cylinder. For this purpose, control valve 30 serves as a crossover valve directing pump flow via line **15*c*** to another valve (not shown) which may be a control valve for the stick cylinder. This allows combining pump flows for operations which may utilize higher flows.

In operation, the present invention provides flow priority to a hydraulic valve that is operated simultaneously with a second hydraulic valve. The controller 44 causes the stroke of the second valve to be reduced when the stroke of the first valve is increased thus providing the first valve with flow priority. The control may be applied to multiple valves that control hydraulic cylinders or motors.

Other aspects, features and advantages can be understood from a study of this disclosure together with the appended claims.

We claim:

1. A hydraulic system for a construction machine comprising a pump for delivering fluid under pressure from a fluid reservoir to at least first and second main valves, said second main valve including first and second pilot valves, comprising:

first and second input means for producing first and second control signals, respectively, said first and second control signals being indicative of a desired operation of the hydraulic system, said second input means being moveable in two directions;

first modulation means for producing first and second actuator signals as a function of said first control signal, said first and second actuator signals being delivered to control said first main valve;

second modulation means for producing third and fourth actuator signals as a function of said second control signal, said third actuator signal being delivered to a first pilot valve associated with said second main valve in response to said second input means being moved in a first direction and said fourth actuator signal being delivered to a second pilot valve in response to said second input means being moved in a second direction;

means for producing a first compensating signal in response to said second input means being moved in a first direction, said first compensating signal being a function of said first and second actuator signals and said fourth actuator signal, said first compensating signal being delivered to a second pilot valve associated with said second main valve;

means for producing a second compensating signal in response to said second input means being moved in a second direction, said second compensating signal being a function of said first and second actuator signals and said third actuator signal, said second compensating signal being delivered to a first pilot valve associated with said second main valve.

2. A hydraulic system, as set forth in claim 1, wherein said means for producing a first compensating signal and means for producing a second compensating signal each includes a look-up table.

3. A hydraulic system, as set forth in claim 1, wherein said first and second compensating signals are positively correlated with both said first and said second actuator signals.

4. A hydraulic system, as set forth in claim 1, wherein each of said first and second modulation means includes a look-up table of control signal values versus actuator signal values.

5. A hydraulic system, as set forth in claim 3, wherein said means for producing a first compensating signal and said means for producing a second compensating signal each includes a look-up table of first and second compensating signal values versus first and second actuator signal values.

6. A method for controlling a hydraulic system said hydraulic system including a hydraulic pump, first and second input device, first and second main valves, said second main valve including first and second pilot valves, comprising the steps of:

producing first and second control signals in response to movement of said first and second input device, respectively, said second input device being moveable in two directions;

producing first and second actuator signals in response to said first control signal;

controlling said first main valve in response to said first and second actuator signals;

producing third and fourth actuator signals in response to said second control signal;

delivering said third actuator signal to said first pilot valve associated with said second main valve in response to said second input device being moved in a first direction and delivering said fourth actuator signal to said second pilot valve associated with said second main valve in response to said second input device being moved in a second direction;

producing a first compensating signal in response to said second input device being moved in a first direction, said first compensating signal being a function of said first and second actuator signals and said fourth actuator signal;

delivering said first compensating signal to said second pilot valve associated with said second main valve;

producing a second compensating signal in response to said second input device being moved in a second direction, said second compensating signal being a function of said first and second actuator signals and said third actuator signal;

delivering said second compensating signal to said first pilot valve associated with said second main valve; and controlling said second main valve in response to said first and second pilot valves.

* * * * *